March 11, 1924.
Re. 15,789
C. H. BIBB
PROCESS OF MAKING ALDEHYDES AND OTHER OXIDATION PRODUCTS
Original Filed Oct. 27, 1919
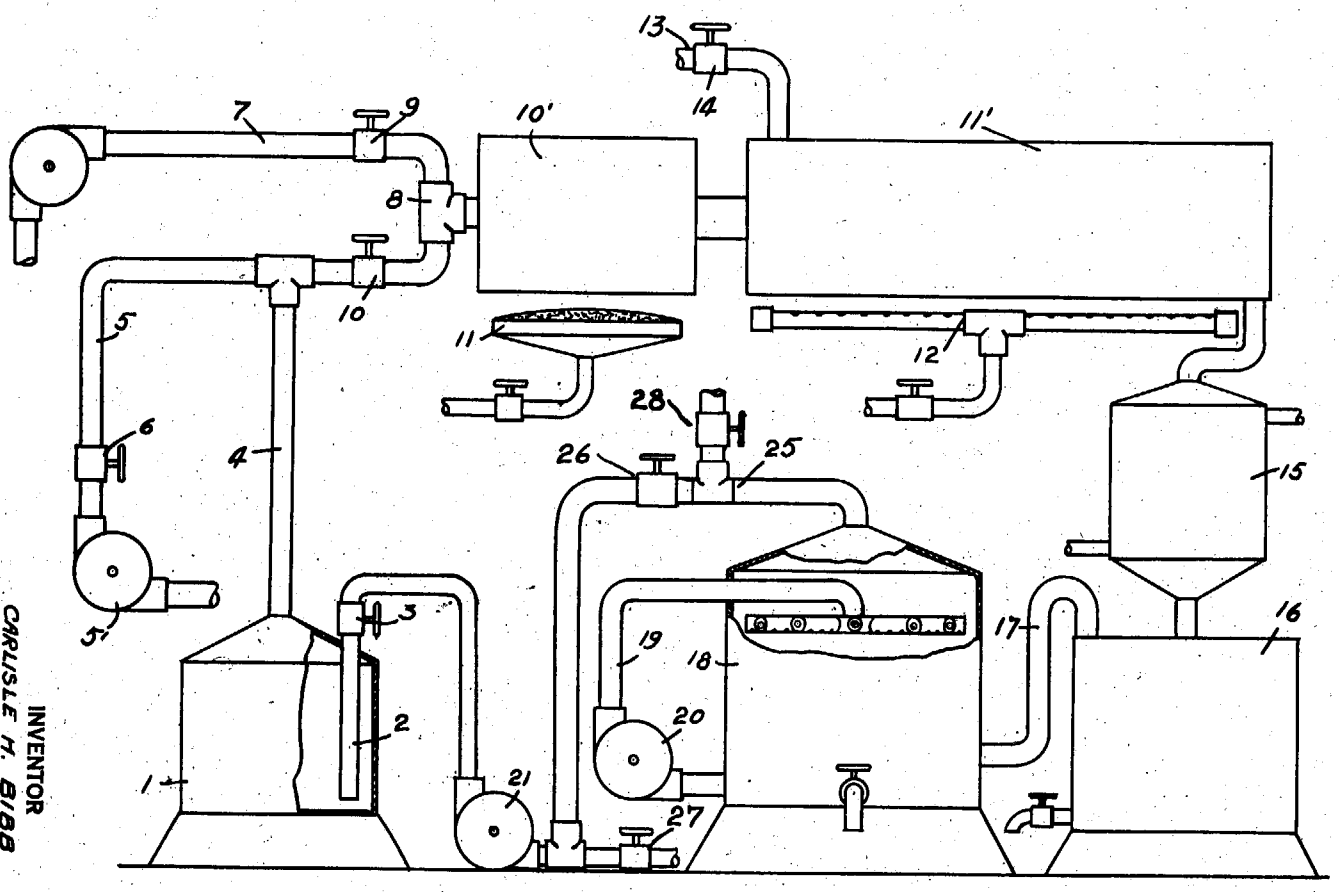
INVENTOR
CARLISLE H. BIBB
BY J. F. Robert
ATTORNEY Reissued Mar. 11, 1924. Re. 15,789

UNITED STATES PATENT OFFICE.

CARLISLE H. BIBB, OF NEW BRUNSWICK, NEW JERSEY.

PROCESS OF MAKING ALDEHYDES AND OTHER OXIDATION PRODUCTS.

Original No. 1,392,886, dated October 4, 1921, Serial No. 333,633, filed October 27, 1919. Application for reissue filed October 1, 1923. Serial No. 666,040.

*To all whom it may concern:*

Be it known that I, CARLISLE H. BIBB, a citizen of the United States, and a resident of New Brunswick, in the county of Middlesex and State of New Jersey, have invented a new and useful Improvement in Processes of Making Aldehydes and Other Oxidation Products, of which the following is a specification.

My invention relates to a process of producing aldehydes and other oxidation products from hydrocarbons.

It is an object of this invention to provide a highly efficient, inexpensive and rapid process of making alcohols, aldehydes and other oxidation products from hydrocarbons by mixing the same with air or oxygen and passing the same, mixed with a gaseous catalyzer, through a heated reaction chamber, the catalyzing agent being of a nature that it can participate in the cycle of operation for an indefinite number of times before being replenished or discarded.

My invention consists in the steps of the process herein described and claimed.

In the accompanying drawing which forms a part of this specification I have illustrated diagrammatically an apparatus suitable for carrying out my process.

I shall describe a process for the production of formaldehyde from methane such as natural gases although my process is not limited thereto and applies to all hydrocarbons and the production of the corresponding alcohols, aldehydes and other oxidation products.

Referring to the drawing, 1 indicates a closed container adapted to contain nitric acid. Air is admitted into the container near the bottom thereof by means of a pipe 2 provided with a control valve 3. The air charged with nitric acid fumes passes from the container 1 through a pipe 4 to an air conduit 5 likewise provided with a control valve 6. 5′ is a blower forcing air under pressure through the air conduit 5. A pipe 7 supplies under pressure methane or a gas containing methane and joins the pipe 5 at 8. There is a valve 9 in the pipe 7 and a valve 10 in the pipe 5 just before their joinder at 8 whereby the supply of methane and the mixture of air and nitric acid fumes, respectively, may be controlled. 10′ is a mixing and preheating chamber into which the methane, air and nitric acid fumes enter. 11 is a burner for heating the mixing and preheating chamber 10′. The mixture of gases passes from the preheating chamber 10′ into the reaction chamber 11′ where the methane is oxidized to methyl alcohol, formaldehyde and higher oxidation products such as formic acid. 12 is a burner for heating the reaction chamber 11′. The gases pass from the reaction chamber 11′ through a condenser 15 of any suitable construction. 16 is a container for collecting the condensed formaldehyde and other oxidation products. The uncondensible gases are led from the collector 16 through a pipe 17 and through a washer and scrubber 18 of any suitable construction, in which traces of formaldehyde and other products are absorbed by water and the like, which is caused to circulate through the washer and scrubber 18 by means of a pipe 19 in which a suitable pump 20 is located. From the washer and scrubber 18 the catalyzing gases may be led through a pipe 25 and blower 21 to the air pipe 2. This may be done by partly opening the valve 26 and partly closing the valves 27 and 9. Inasmuch as a quantity of air is continually admitted to the apparatus through the valve 27 and fresh gas supplied by regulating the valve 9, a means of escape must be had. This is provided by manipulation of the valve 28. If it is desired to use the gases but once, the tail gases may be discharged from the system by closing the valve 26 and opening the valve 28.

In carrying out the process the air and methane admitted to the mixing and preheating chamber 10′ are supplied in the proportion of one volume of methane to five volumes of air. The nitrogen oxids mix with the air and constitute from one to two per cent by weight of the mixture of air and methane. The mixed gases are heated to approximately 200° C. and pass through the reaction chamber 11′ where they are subjected to a temperature of from 250° to 560° C. To facilitate the uniform heating of the gases it may be advisable to fill the reaction chamber with broken pieces of fire clay or the like.

It will be apparent to those skilled in the art that the yield of formaldehyde obtained from my process is influenced by such factors as the rate of flow of the air and the methane or gas containing methane; also the size and temperature of the reaction chamber, as well as the material from which said chamber is made, are to be taken into consideration. However, inasmuch as all of these factors may be widely varied it is a comparatively simple matter to organize the apparatus and adapt the process thereto so as to obtain satisfactory results, especially so long as regard is had for keeping the relative proportions of methane and air substantially to those specified and the quantity of nitrogen oxids mixed therewith adjusted to constitute from one to two per cent by weight of the mixture of air and methane.

The reactions taking place in the chamber 11′ are complicated. The nitrogen oxids act as catalyzers or carriers of oxygen to effect the oxidation of the methane by the air or oxygen admitted for that purpose. In other words, the nitrogen oxids function as catalyzers for the oxidizing agent but do not constitute the oxidizing agent. This is believed to be proven in many respects but perhaps can best be illustrated by the following formulæ:

$$CH_4+O_2+N_xO_y=CH_2O+H_2O+N_xO_y$$

As further establishing that the catalyzing gases employed in my process effect the oxidation of the methane and do not function as the oxidizing agent, attention is directed to the fact that it is unnecessary for me to employ a neutralizing agent to prevent the reactions from going too far with the resultant decomposition of the formaldehyde which is obtained.

As still further indicating that the nitrogen oxids act as catalyzers or carriers of oxygen for effecting the oxidation of the methane and not as the oxidizing agent, reference may be had to the literature. Bredig, in Ullmann's Encyclopædie der technischen Chemie, vol. 6, page 670, gives the following definition of a catalyzer: "A catalyzer is a substance which changes the speed of a chemical reaction. The catalyzer may remain unchanged or may be changed. In the latter case it is considered to be a catalyzer as long as there exists no equivalent relation between the changed quantity of the catalyzer and the changed quantities of the substances that undergo the catalytic reaction."

In the present process it is immaterial whether the catalyzing gas is changed or remains unchanged while functioning inasmuch as there exists no general relation between the catalyzer and the substances undergoing catalytic reaction, for the proportion of formaldehyde formed is much greater than would be obtained if the catalyzing gases functioned as an oxidizing agent for the methane.

I do not wish to be understood as specifying the catalyzing agent to be a given one of the nitrogen oxids which are formed by practicing my process, inasmuch as all of these oxids may function as catalyzers. As previously stated, the reactions which take place in the chamber 11′ are complicated and difficult to analyze and are of no special concern beyond knowing that nitrogen oxids are formed and each of these may act as catalyzers severally and/or collectively.

The reaction in the chamber 11′ takes place exceedingly rapidly, eight seconds being sufficient for the passage of the gases therethrough, and in which practically all the methane is converted into formaldehyde, methyl alcohol and other oxidation products, the latter being about one per cent each of the formaldehye formed. The gases leaving the condenser are subjected to the washing and scrubbing operation in the scrubber 18 in which uncondensed portions of the reaction products are removed. The tail gases leaving the scrubber 18 and containing nitrogen oxid gases may be used again in the cycle of operation until they become so diluted with nitrogen, in case air and not oxygen is used in this process, that they must be discarded.

It may be desirable to make a mixture of alcohols, aldehydes and other oxidation products from natural gases containing not only methane but other hydrocarbons, or other hydrocarbons alone, or mixed, may be used. There is a ready market for a mixture of aldehydes, which for many purposes, is as good as formaldehyde.

I have described the use of nitrogen oxids as the catalyzing agent in my process. However, other gaseous oxids, or oxygen acid, or oxids which will volatilize at the temperature of the reaction chamber may be used, such as the oxids of sulfur; carbon dioxid may also be used, and in place of air oxygen may be used.

It has been known for some time that when a mixture of air and natural gas or methane is passed through a tube or chamber heated to redness a small amount of formaldehyde is produced. I have also found this to be true. Now when a small amount of the oxids of nitrogen such as 1% to 2% are mixed with the mixture of air and methane or natural gas, the speed of the reaction which causes the formation of formaldehyde is greatly increased when passed through a heated chamber. The oxids of nitrogen are not reduced but come out of the reaction chamber in the same amount and kind as they went into the chamber showing that said oxids have not been altered and therefore act as catalyzers for a reaction which already exists. As further evidence of this, all the methane reacts with the air to form oxidation products very rapidly which would not be the case if the small amount of oxids acted as an oxidizing agent. I have also found that if the amount of oxids of nitrogen is increased much over 1% to 2% of the total gaseous mixture they become a serious detriment to the formation and recovery of methyl alcohol, formaldehyde and formic acid.

It should be noted that my process uses only a very small quantity, preferably only one to two per cent of the nitrogen oxid as compared with the weight of the mixture of air and hydrocarbon that is used as a base for the production of alcohols, aldehydes, and other oxidation products. The nitrogen oxid serves as a catalyzer or a carrier of oxygen to effect the oxidation of the hydrocarbon.

The proportion of methane, air and the catalyzing agent may be widely varied with good results, although the proportions given in connection with methane, air and nitric acid fumes are preferred.

Various changes in the steps of my process may be made by those skilled in the art without departing from the spirit of my invention as claimed.

What is claimed is:

1. A process of converting hydrocarbons into alcohols, aldehydes and other oxidation products, comprising mixing hydrocarbon, oxygen, and a gaseous catalyzer containing oxygen, said catalyzer being used in quantities substantially less than the quantity of hydrocarbon, heating the mixture, and separating the alcohols, aldehydes and other oxidation products from the mixture.

2. A process of converting hydrocarbons into aldehydes, comprising mixing hydrocarbon, oxygen and a gaseous catalyzer consisting of nitrogen oxids, the nitrogen oxids being used in relatively small quantities as compared with the quantity of hydrocarbon, heating the mixture, and separating the aldehydes from the mixture.

3. A process of converting methane into formaldehyde, comprising mixing methane, oxygen, and a relatively small quantity of a gaseous catalyzer comprising a nitrogen oxid, heating the mixture and separating the formaldehyde formed from the mixture.

4. A process of converting methane into formaldehyde, comprising mixing methane, air, and a relatively small quantity of a gaseous catalyzer comprising a nitrogen oxid, heating the mixture to a temperature exceeding 500° C., and separating the formaldehyde formed from the mixture.

5. A process of converting methane into formaldehyde, comprising mixing methane, oxygen, and a relatively small quantity of a gaseous catalyzer consisting of nitrogen oxids, heating the mixture and separating the formaldehyde formed from the mixture.

6. A process of converting methane into formaldehyde, comprising mixing methane, air, and a relatively small quantity of a gaseous catalyzer consisting of nitrogen oxids, heating the mixture to a temperature exceeding 500° C., and separating the formaldehyde formed from the mixture.

7. A process of converting hydrocarbons into aldehydes and other oxidation products, comprising mixing hydrocarbon and air, and a gaseous catalyzer, the quantity of the gaseous catalyzer being relatively small as compared with the quantity of the mixture of hydrocarbon and air, heating the mixture and separating the aldehydes and other oxidation products from the mixture.

8. A process of converting methane into formaldehyde, comprising mixing methane, air and nitrogen oxids, the nitrogen oxids being from one per cent to two per cent by weight of the mixture of air and methane, heating the mixture and separating the formaldehyde formed from the mixture.

9. A process of converting methane into formaldehyde, comprising mixing methane, oxygen, and a relatively small quantity of a gaseous catalyzer for effecting the oxidation of the methane by the oxygen, heating the mixture and separating the formaldehyde formed from the mixture.

10. A process of converting methane into formaldehyde, comprising mixing methane, oxygen, and a relatively small quantity of a gaseous catalyzer for effecting the oxidation of the methane by the oxygen, said catalyzer comprising a nitrogen oxid, heating the mixture and separating the formaldehyde formed from the mixture.

11. A process of converting methane into formaldehyde, comprising mixing methane, oxygen, and a relatively small quantity of a gaseous catalyzer for effecting the oxidation of the methane by the oxygen, said catalyzer consisting of nitrogen oxids, heating the mixture and separating the formaldehyde formed from the mixture.

In testimony whereof, I have hereunto subscribed my name this 29th day of September, 1923.

CARLISLE H. BIBB.